United States Patent [19]
Barthelemy et al.

[11] Patent Number: 6,086,784
[45] Date of Patent: Jul. 11, 2000

[54] PREMIXES FOR THE PREPARATION OF POLYURETHANE OR POLYISOCYANURATE FOAMS

[75] Inventors: Pierre Barthelemy, Pietrebais; Annie Leroy, Libramont, both of Belgium

[73] Assignee: Solvay S.A., Brussels, Belgium

[21] Appl. No.: 09/170,117

[22] Filed: Oct. 13, 1998

Related U.S. Application Data

[63] Continuation of application No. 08/717,879, Sep. 23, 1996, Pat. No. 5,889,286.

[30] Foreign Application Priority Data

Sep. 26, 1995 [BE] Belgium ............................ 09500794

[51] Int. Cl.$^7$ ................. C08J 9/14; C08K 5/02; C08K 5/05; C08K 5/053

[52] U.S. Cl. ................. 252/182.16; 252/182.24; 252/182.27; 252/182.28; 252/182.29; 521/114; 521/116; 521/117; 521/130; 521/131; 521/170; 521/171; 521/172; 521/174; 521/902

[58] Field of Search ............ 252/182.24, 182.27, 252/182.28, 182.29, 182.16; 521/114, 116, 117, 130, 131, 170, 171, 172, 174, 902

[56] References Cited

U.S. PATENT DOCUMENTS

| | | | |
|---|---|---|---|
| 5,137,929 | 8/1992 | Demmin et al. | 521/99 |
| 5,268,120 | 12/1993 | Michaud | 510/177 |
| 5,268,121 | 12/1993 | Michaud | 510/177 |
| 5,348,681 | 9/1994 | Desbiendras et al. | 510/273 |
| 5,350,534 | 9/1994 | Michaud | 510/273 |
| 5,366,662 | 11/1994 | Barthelemy et al. | 521/131 |
| 5,395,859 | 3/1995 | Demmin et al. | 521/125 |
| 5,407,596 | 4/1995 | Mafoti et al. | 521/131 |
| 5,464,560 | 11/1995 | Schilling et al. | 521/170 |
| 5,496,866 | 3/1996 | Sommerfeld et al. | 521/131 |
| 5,561,171 | 10/1996 | Demmin et al. | 521/118 |
| 5,561,172 | 10/1996 | Omure et al. | 521/131 |
| 5,840,779 | 11/1998 | Parker et al. | 521/118 |
| 5,856,679 | 1/1999 | Barthelemy et al. | 252/182.24 |
| 5,895,793 | 4/1999 | Kitamura et al. | 252/350 |

FOREIGN PATENT DOCUMENTS

| | | |
|---|---|---|
| 0381986 | 8/1990 | European Pat. Off. |
| 0405615 | 1/1991 | European Pat. Off. |
| 0503441 | 9/1992 | European Pat. Off. |
| 0555914 | 8/1993 | European Pat. Off. |
| 0590709 | 4/1994 | European Pat. Off. |
| 93/00379 | 1/1993 | WIPO |

*Primary Examiner*—Rabon Sergent

[57] ABSTRACT

Premixes intended for the preparation of polyurethane or polyisocyanurate foams comprising at least one polyol, at least one hydrofluoroalkane corresponding to the general formula $CF_3-CR^1R^2-CF_2-R^3$, where $R^1$ and $R^2$ represent, independently, a hydrogen atom or an optionally fluorinated $C_1-C_3$ alkyl group and where $R^3$ represents a hydrogen atom or a methyl group, and at least one stabilizer chosen from nitroalkanee, diketones, alkaline-earth metal salts and brominated compounds.

14 Claims, No Drawings

PREMIXES FOR THE PREPARATION OF POLYURETHANE OR POLYISOCYANURATE FOAMS

CROSS REFERENCE TO RELATED APPLICATIONS

This application is a continuation of application No. 08/717,879, filed Sep. 23, 1996, and now U.S. Pat. No. 5,889,286, the contents of which are incorporated herein by reference.

1. Field of the Invention

The present invention relates to premixes intended for the preparation of polyurethane or polyisocyanurate foams, to a process for the manufacture of such foams and to the foams obtained.

2. Technology Review

It is well known that polyurethane or polyisocyanurate foams can be prepared by reacting an isocyanate with an appropriate amount of a polyol or of a mixture of polyols, in the presence of a blowing agent consisting of a volatile liquid hydrofluoroalkane, which hydrofluoroalkane is evaporated by the heat released by the reaction between the isocyanate and the polyol.

However, it is well known that hydroiluoroalkanes are generally susceptible to being partially degraded on contact with certain polyols or with certain catalysts, in particular on contact with trimerization catalysts conventionally used in polyisocyanurate-type informulations. This problem generally requires the addition to the hydrofluoroalkanes of stabilizers, in order to inhibit their degradation during the stage of manufacture of the foam, as well as subsequently, within the polyurethane or polyisocyanurate foam.

Moreover, it is common practice in the field of polyurethane or polyisocyanurate foams to prepare premixes of certain components which will subsequently be used to prepare the foam. Usually, the appropriate amounts of polyol, blowing agent and other optional additives are mixed to form a premix. This premix and the appropriate amount of isocyanate are generally provided in two separate tanks, the final user then only having to mix the contents of the two tanks in order to manufacture the foam. Moreover, in large-scale foam production units, the mixture containing the polyol and the blowing agent is sometimes stored. This liquid mixture has a lower viscosity than that of the pure polyol and is consequently easier to pump and-to meter to the foam-manufacturing area. The hydrofluoroalkanes, at this stage too, are generally capable of being partially degraded, which generally requires the use of stabilizers in order to inhibit their degradation during storage.

In addition, it is currently considered necessary, in order to satisfy environmental protection regulations, to find blowing agents which are entirely free from chlorine, in this way exhibiting a zero ozone destruction potential. In particular, the use of certain $C_3$–$C_5$ hydrofluoroalkanes has been provided for this purpose in Application EP-A-381,986.

SUMMARY OF THE INVENTION

One aim of the present invention is to identify, among the numerous hydrofluoroalkanes which can potentially be used as blowing agents which satisfy the requirements of respecting the environment, those which can be effectively stabilized, preferably at the same time in the premixes, during the stage of manufacture of the foam and subsequently within the polyurethane or polyisocyanurate foams.

Another object of the present invention is to provide premixes intended for the manufacture of polyurethane or polyisocyanurate foams containing a hydrofluoroalkane of improved stability with respect to the degradation induced by the other constituents of the premixes.

Another subject of the present invention is a process for the manufacture of polyurethane or polyisocyanurate foams containing a hydrofluoroalkane, in which the decomposition of the hydrofluoroalkane is effectively inhibited.

DETAILED DESCRIPTION OF THE INVENTION

The invention consequently relates to premixes intended for the preparation of polyurethane or polyisocyanurate foams comprising at least one polyol, at least one hydrofluoroalkane corresponding to the general formula

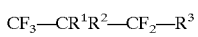

$$CF_3-CR^1R^2-CF_2-R^3$$

where $R^1$ and $R^2$ represent, independently of one another, a hydrogen atom or an optionally fluorinated $C_1$–$C_3$ alkyl group and where $R^3$ represents a hydrogen atom or a methyl group, and at least one stabilizer chosen from nitroalkanes, diketones, alkaline-earth metal salts and brominated compounds.

Polyurethane is understood to mean the polymers resulting essentially from the reaction of polyols and of isocyanates. These polymers are typically obtained from formulations exhibiting an isocyanate number from 100 to 130.

Polyisocyanurate is understood to mean the polymers resulting from the reaction of polyols and of isocyanates which contain in addition to urethane functional groups, other types of functional groups, in particular triisocyanuric rings formed by trimerization of the isocyanates. These polymers, normally also known as modified polyurethanes, are typically obtained from formulations exhibiting an isocyanate number from 130 to 450.

For the purposes of the present invention, premix is understood to mean any composition comprising at least one polyol and at least one blowing agent.

For the purposes of the present invention, polyol is understood to mean any compound containing at least two functional groups which react with isocyanates. These functional groups contain at least one active hydrogen atom, such as defined by the Zerewittinoff reaction. The active hydrogen atom is generally a hydrogen atom bonded to an oxygen, nitrogen or sulphur atom. Any polyol conventionally used to prepare polyurethane foams can be used in the premix according to the invention. Mention may particularly be made of polyether polyols and polyester polyols.

Hydrofluoroalkanes which are preferred in the premixes according to the invention are 1,1,1,3,3-pentafluoropropane, 1,1,1,3,3-pentafluorobutane and 2-methyl-1,1,1,3,3-pentafluoropropane. 1,1,1,3,3-Pentafluoropropane and 1,1,1,3,3-pentafluorobutane are particularly preferred.

Preferred nitroalkanes are $C_1$–$C_6$ nitroalkanes, such as nitromethane, nitroethane, 1-nitropropane, 2-nitropropane, 1-nitrobutane, 1-nitropentane and 1-nitrohexane. Nitromethane and 1-nitropentane are particularly preferred, in particular in premixes suitable for the preparation of polyisocyanurate foams.

Preferred diketones are $C_5$–$C_{10}$ aliphatic diketones and benzoguinones optionally substituted by at least one $C_1$–$C_{10}$ alkyl group. The preferred diketones can be halogenated. The preferred aliphatic diketones are β-diketones, such as acetylacetone. Among the benzoquinones, 1,4-benzoquinones, tetrahydro-1,4-benzoguinones, 2-chloro-1,4-benzoguinones and 1,4-beinzoquinone substituted by one or a number of $C_1$–$C_5$ alkyl groups are preferred. 1,4-Benzoguinones is particularly preferred.

Preferred alkaline-earth metal salts are calcium or magnesium halides and nitrates. The chlorides are particularly preferred.

Preferred brominated compounds are bromoalkanes and bromoalcohols.

Bromoalkane is understood to denote any compound containing a saturated aliphatic group substituted by at least one bromine atom. The preferred bromoalkanes are the $C_1$–$C_{10}$ bromoalkanes. Mention may be made, by way of examples, of bromomethane, dibromomethane, tetrabromomethane, 1,2-dibromoethane, 1,5-dibromopentane, 2-methyl-2-bromopropane and 1,4-(dibromomethyl)benzene. $C_1$–$C_6$ bromoalkanes are particularly preferred.

Bromoalcohol is understood to denote any compound comprising at least one bromine atom and at least one hydroxyl group within the molecular structure. The presence of other functional groups within these compounds is not excluded. Preferred bromoalcohols are $C_3$–$C_{20}$ bromoalcohols. Mention may be made, by way of examples, of tribromoneopentyl alcohol, 2,3-dibromobut-2-ene-1,4-diol, brominated aromatic polyols, such as brominated bisphenol A derivatives, for example the polyol Fox-O-Pol® VD280S from Shell, brominated polyether polyols, for example those produced by addition of epichlorohydrin to 2,3-dibromobut-2-ene-1,4-diol, sold by Solvay under the trademark Ixol®, or brominated aromatic polyester polyols, such as di(hydroxyalkyl) tetrabromophthalates, sold by Great Lakes Chemicals under the trade mark PHT4-Diol®.

The most particularly preferred stabilizers in the premixes according to the invention are benzoquinones and brominated compounds.

In addition to the polyol, the hydrofluoroalkane and the stabilizer, the premixes according to the invention can additionally contain various additives commonly used to prepare polyurethane or modified polyurethene foams, such as, in particular, water, catalysts, surface-active agents, antioxidizing agents, flame-retardant agents and/or pigments.

Mention may be made, as catalyst, of compounds which promote the formation of the —NH—CO—O— urethane bond by reaction between a polyol and an isocyanate or which activate the reaction between an iscmcyanate and water, such as tertiary amines and organic tin, iron, mercury or lead compounds.

The premixes according to the invention suited to the preparation of polyisocyanurate foams generally contain a trimerization catalyst, that is to say a compound which catalyses the trimerization reaction of isocyanates to triisocyanurates. Mention may be made, as trimerization catalysts, of alkali metal carboxylates, such as potassium octanoate, hydroxyalkylammonium carboxylates and triazines. These catalysts are most often used in combination with compounds which promote the formation of the urethane bond.

The optimum proportions of polyol, hydrofluoroalkane, stabilizer and optional additives in the premixes according to the invention depend in particular on the application, on the type of foam prepared, on the nature of the polyol, on the nature of the hydrofluoroalkane, on the nature of the stabilizer and on the nature of the additives. They can be easily determined in each specific case. In practice, the amount of hydrofluoroalkane is generally from 1 to 80 parts by weight per 100 parts by weight of polyol. It is preferably from 10 to 60 parts by weight per 100 parts by weight of polyol. In general, the amount of stabilizer used is from approximately 0.05 to 25 parts by weight per 100 parts by weight of hydrofluoroalkane. It is preferably from approximately 0.1 to 20 parts by weight per 100 parts by weight of hydrofluoroalkane. In a particularly preferred way, it is from 0.5 to 15 parts by weight per 100 parts by weight of hydrofluoroalkane. When the stabilizer is a brominated polyether polyol or a brominated polyester polyol, it can be used in a larger amount, instead of part or all of the non-brominated polyol of the premix. The amounts of water, catalysts, surface-active agents, plasticizing agents and/or flame-retardant agents in the premixes according to the invention are those conventionally used to prepare polyurethane or polyisocyanurate foams.

The premixes according to the invention are intended for the manufacture of polyurethane foams or polyisocyanurate foams by reaction with an isocyanate. In particular, excellent results were obtained with premixes according to the invention suited to the manufacture of rigid polyisocyanurate foams. These premixes proved to be particularly stable, giving rise to virtually no degradation of the hydrofluoroalkane despite the presence within them of trimerization catalysts which induce, in the absence of the stabilizers mentioned above, significant degradation of the hydrofluoroalkanes.

The invention also relates to a process for the manufacture of polyurethane or polyisocyanurate foams in which at least one isocyanate is reacted with at least one polyol in the presence of a hydrofluoroalkane and of a stabilizer which are described above with respect to the premixes according to the invention.

Any isocyanate conventionally used to manufacture such foams can be used in the process according to the invention. Mention may be made, by way of examples, of aliphatic isocyanates, such as hexamethylene diisocyanate, and aromatic isocyanates, such as tolylene diisocyanate or diphenylmethane diisocyanate.

The invention also relates to polyurethane or polyisocyanurate foams obtained by use of a premix or of a process in accordance with the invention, as defined above.

EXAMPLES

The examples below illustrate the invention in a non-limiting way. Examples 1, 3, 7, 10 to 15, 17, 19 and 21 to 27 are in accordance with the invention. Examples 2, 4, 5, 6, 8, 9, 16, 18 and 20, annotated (C), are provided by way of comparison.

Except when otherwise explicitly mentioned, all the amounts of the constituents used in the examples are expressed as parts by weight per 100 parts of polyol.

Examples 1 to 6

Six premixes for the preparation of polyisocyanurate foams were prepared in the following proportions by weight:

- 100 parts of polyether polyol on a sucrose base Tercarol® RF33, sold by Enichem
- 1 part of water
- 1 part of silicone surface-active agent Tegostab B 8404 from Goldschmidt
- 3 parts of N,N-dimethylcyclohexylamine
- 7 parts of potassium acetate Kacecat KCA, sold by Solvay Fluor und Derivate GmbH
- 1,1,1,3,3-pentafluoropropane (HFC-245fa),
- 1,1,1,3,3-pentafluorobutane (HFC-365mfc) or 1,1-dichloro-1-fluoroethane (HCFC-141b), in the proportions specified in Table I
- optionally 2 parts of nitromethane, as specified in Table I.

These premixes were stored at a constant temperature of 70° C. for 2 months and were then analysed by gas phase chromatography, in order to measure the amounts of unsaturated products formed by dehydrohalogenation of the blowing agent.

The results are presented in Table I below. Comparison of Examples 1 and 3 according to the invention with Examples 2(C) and 4(C) shows that degradation of the 1,1,1,3,3-pentafluorobutane and 1,1,1,3,3-pentafluoropropane is partially inhibited by nitromethane, in contrast to what is observed for the 1,1-dichloro-1-fluoroethane (Comparison Examples 5(C) and 6(C)). The result thereof is that inhibition of degradation is obtained solely in the simultaneous presence of hydrofluoroalkanes and of stabilizers in accordance with the invention.

diisocyanate Desmodur® 44V20, sold by Bayer, and with a premix with the following composition:

100 parts of polyether polyol on a sorbitol base Tercarol® RF55, sold by Enichem
  1 part of water
  2 parts of silicone surface-active agent Tegostab® B 0404 from Goldschmidt
  3 parts of N,N-dimethylcyclohexylamine
  7 parts of potassium acetate Kacecat® KCA, sold by Solvay Fluor und Derivate GmbH
  60 parts by weight of 1,1,1,3,3-pentafluorobutane (365mfc).

The polyol, the surface-active agent, the water and the blowing agent were successively introduced into a mixing

TABLE I

|  | Example 1 | Example 2(C) | Example 3 | Example 4(C) | Example 5(C) | Example 6(C) |
|---|---|---|---|---|---|---|
| Blowing agent (parts by weight) | 365mfc (20) | 365mfc (20) | 245fa (20) | 245fa (20) | 141b (40) | 141b (40) |
| Nitromethane, parts by weight | 2 | 0 | 2 | 0 | 2 | 0 |
| Molar % of dehydrohalogenated blowing ag. | 0.97% | 1.42% | 0.75% | 1.28% | 2.22% | 1.87% |

Examples 7 and 8 (C)

Two premixes for the preparation of polyisocyanurate foams were prepared in the following proportions by weight:
  100 parts of polyether polyol on a sucrose base Tercarol® RF33, sold by Enichem
  1 part of water
  1 part of silicone surface-active agent Tegostab® B 8404 from Goldschmidt
  3 parts of N,N-dimethylcyclohexylamine
  7 parts of N-2-hydroxypropyltrimethylammonium 2-ethylhexanoate DABCO® TMR, sold by Air Products and Chemicals
  20 parts of 1,1,1,3,3-pentafluorobutane (HFC-365mfc),
  optionally 1 part of 1,4-benzoquinones, as specified in Table II.

These premixes were stored at a constant temperature of 70° C. Samples were removed after different storage times under these conditions and analysed by gas phase chromatography, in order to measure the amounts of unsaturated products formed by dehydrohalogenation of the blowing agent. The results are presented in Table II. In the premix used, 1,4-benzoguinones significantly inhibits degradation of the HFC-365mfc.

TABLE II

|  | Example 7 | Example 8(C) |
|---|---|---|
| 1,4-Benzoquinone, parts by weight | 1 | 0 |
| Molar % of dehydrohalogenated blowing agent |  |  |
| after 14 days | 0.66% | 1.07% |
| after 1 month | 1.07% | 1.64% |
| after 2 months | 1.74% | 2.57% |

Example 9–17

In Example 9 (C), a polyisocyanurate foam was prepared by handmixing, starting with a polymeric diphenylmethane bowl and then, after a first period of stirring, the catalysts were introduced. The isocyanate was then added, in the proportion of 404.3 parts per 100 parts of polyol, which corresponds to an isocyanate number of 300 (100 times the ratio of the number of isocyanate functional groups to the number of hydroxyl functional groups in the reaction mixture). The composition obtained was then immediately intimately mixed for 25 seconds by means of a multiblade-type stirrer rotating at 1600 revolutions per minute and was then decanted into a free-expansion mould where expansion and maturing of the foam take place.

In Example 10, 0.3 part by weight of nitromethane (NM) per 100 parts of polyol was introduced into the premix.

In Example 11, 3 parts by weight of nitromethane (NM) per 100 parts of polyol were introduced into the premix.

In Example 12, 3 parts by weight of 1-nitro-pentane (NP) per 100 parts of polyol were introduced into the premix.

In Example 13, 3 parts by weight of 1,4-benzoquinone (BQ) per 100 parts of polyol were introduced into the premix.

In Example 14, 3 parts by weight of calcium chloride per 100 parts of polyol were introduced into the premix.

In Example 15, 3 parts by weight of magnesium chloride per 100 parts of polyol were introduced into the premix.

In Example 16 (C), 1,1,1,3,3-pentafluoropropane (245fa) was used instead of 1,1,1,3,3-pentafluorobutane, in the absence of stabilizer.

In Example 17, 3 parts by weight of nitromethane (NM) per 100 parts of polyol were introduced into the premix of Example 16.

In Example 18, 0.6 part by weight of acetylacetone (AAC) per 100 parts of polyol was introduced into the premix of Example 16.

For each foam, the reactivity profile was recorded and the content of products from the dehydrohalogenation of the hydrofluoroalkane within the foam, immediately after its manufacture and after storage under different conditions, was measured by chromatographic analysis. The results are combined in Table III. The addition of a stabilizer in accordance with the invention substantially inhibits the degradation undergone by the HFC-365mfc or by the HFC-245fa in the polyisocyanurate foam tested.

and with premixes containing an aminated polyol on a sucrose base Caradol® 585-8 from Shell and a brominated

TABLE III

|  | Example 9 (C) | Example 10 | Example 11 | Example 12 | Example 13 | Example 14 | Example 15 | Example 16 (C) | Example 17 | Example 18 |
|---|---|---|---|---|---|---|---|---|---|---|
| BLOWING AGENT | 365mfc | 365mfc | 365mfc | 365mfc | 365mfc | 365mfc | 365mfc | 245fa | 245fa | 245fa |
| STABILIZER | | | | | | | | | | |
| Nature | — | NM | NM | NP | BQ | $CaCl_2$ | $MgCl_2$ | — | NM | AAC |
| Parts by weight | — | 0.3 | 3 | 3 | 3 | 3 | 3 | — | 3 | 0.6 |
| REACTIVITY PROFILE | | | | | | | | | | |
| Cream time, s | 25 | 16 | 23 | 21 | 21 | 24 | 20 | 23 | 23 | 18 |
| String time, s | 67 | 50 | 69 | 56 | 59 | 120 | 60 | 102 | 98 | 81 |
| Tack-free time, s | 75 | 65 | 100 | 72 | 70 | 240 | 79 | 120 | 170 | 106 |
| Rise time, s | 94 | 76 | 115 | 85 | 60 | 120 | 65 | 130 | 120 | 110 |
| Curing time, min | 1.5 | 2 | 15 | 1.5 | 1.5 | 25 | 2 | 2.5 | 18 | 2.25 |
| Molar % of dehydrohalogenated blowing agent | | | | | | | | | | |
| Beginning | 1.65 | 0.36 | 0.01 | 0.69 | 0.67 | 0.08 | 1.09 | 2.91 | 0.25 | 1.65 |
| 50° C., 1 month | 1.10 | 0.27 | n.m.* | n.m.* | 0.58 | n.m.* | 0.87 | 3.16 | 0.64 | n.m.* |
| 100° C., 1 month | n.m.* | 0.37 | 0.09 | 0.70 | 0.68 | 0.11 | n.m.* | 1.77 | 0.59 | 1.24 |

*n.m.: not meaeured

Example 19–22

The tests of Examples 9 (C) and 11 were repeated, potassium acetate being replaced by an identical amount of hexahydro-1,3,5-tris[3-(N,N-dimethylamino)propyl]-1,3,5-triazine Polycat® 41, sold by Air Products and Chemicals. The results obtained are collated in Table IV.

The tests of Examples 16 (C) and 17 were repeated, potassium octanoate being replaced by an identical amount of N-2-hydroxypropyltrimethylammonium 2-ethylhexanoate Dabco® TMR, sold by Air Products and Chemicals. The results obtained are collated in Table IV. A significant reduction in the degradation of the hydrofluoroalkane was observed.

TABLE IV

|  | Example 19(C) | Example 20 | Example 21(C) | Example 22 |
|---|---|---|---|---|
| BLOWING AGENT | 365mfc | 365mfc | 245fa | 245fa |
| STABILIZER | | | | |
| Nature | — | NM | — | NM |
| Parts by weight | — | 3 | — | 3 |
| REACTIVITY PROFILE | | | | |
| Cream time, s | 18 | 14 | 25 | 25 |
| String time, s | 69 | 62 | 120 | 150 |
| Tack-free time, s | 90 | 95 | 176 | n.m. |
| Rise time, s | 90 | 115 | 180 | n.m. |
| Curing time, min | 3 | 16 | 3.5 | >15 |
| Molar % of dehydrohalogenated blowing agent | | | | |
| Beginning | 0.04 | 0.01 | 1.62 | 0.19 |
| 50° C.; 1 month | 0.08 | n.m. | 1.57 | 0.64 |

*n.m.: not measured

Examples 23–26

Polyisocyanurate foams (isocyanate number 300) were prepared by handmixing, starting with a polymeric diphenylmethane diisocyanate Desmodur® 44V20 from Bayer polyether polyol Ixol® B251 from Solvay. The composition of the premixes used is given in Table V, as well as the results obtained. The degradation undergone by the EFC-365mfc in these compositions is virtually negligible.

TABLE V

|  | Example 23 | Example 24 | Example 25 | Example 26 |
|---|---|---|---|---|
| Aminated polyol Caradol ® 585-8 | 30 | 30 | 30 | 30 |
| Brominated polyether polyol Ixol ® B251 | 70 | 70 | 70 | 70 |
| Trichloropropyl phosphate | 20 | 20 | 20 | — |
| Silicone Tegostab ® B 8404 | 3 | 3 | 3 | 3 |
| Water | — | — | — | 1 |
| N,N-Dimethylbenzylamine | 2 | 2 | — | — |
| N,N-Dimethylcyclohexylamine | — | — | 2 | 2 |
| Potassium acetate | — | 4.5 | 4.5 | 4.5 |
| Dabco ® TMR2(1) | 4.5 | — | — | — |
| 1,1,1,3,3-Pentafluorobutane | 50 | 50 | 50 | 50 |
| REACTIVITY PROFILE | | | | |
| Cream time, s | 55 | 50 | 16 | 21 |
| String time, s | 110 | 85 | 40 | 61 |
| Tack-free time, s | 145 | 100 | 50 | 85 |
| Rise time, s | 165 | 115 | 55 | 85 |
| Curing time, sin | 4.5 | 3.5 | 2 | 3.5 |
| Molar % of dehydrohalogenated blowing agent | | | | |
| Beginning | 0.05 | 0.06 | 0.09 | 0.09 |
| 50° C.; 1 month | 0.06 | 0.05 | 0.07 | 0.06 |

(1): N-2-Hydroxypropyltrimethylammonium formate, sold by Air Products and Chemicals Examples 27–28

Polyisocyanurate foams (isocyanate number 300) were prepared by handmixing, starting with a polymeric diphenylmethane diisocyanate Desmodur® 44VF20, sold by Bayer, and with premixes based on an aminated polyol Caradol® 585-8 from Shell and on a polyether polyol on a sorbitol base Tercarol® RF 55 from Enichem, containing a bromoalcohol or a bromoalkane. The composition of the 2 premixes used is given in Table VI, as well as the results obtained. The degradation undergone by the HFC-365mfc in these compositions is virtually negligible.

TABLE VI

|  | Example 27 | Example 28 |
|---|---|---|
| Aminated polyol Caradol ® 585-8 | 30 | 30 |
| Polyether polyol Tercarol ® RF 55 | 70 | 70 |
| trans-2,3-Dibromobut-2-ene-1,4-diol | 10 | — |
| 2-Methyl-2-bromopropane | — | 11.1 |
| Silicone Tegostab ® B 8404 | 3 | 3 |
| Water | 1 | 1 |
| N,N-Diethylcyclohexylamine | 2 | 2 |
| potassium acetate | 4.5 | 4.5 |
| 1,1,1,3,3-Pentafluorobutane | 50 | 50 |
| REACTIVITY PROFILE | | |
| Cream time, s | 20 | 22 |
| String time, s | 65 | 60 |
| Tack-free time, s | 95 | 84 |
| Rise time, s | 100 | 95 |
| Curing time, min | 3.5 | 2.5 |
| Molar % of dehydrohalogenated blowing agent | | |
| Beginning | 0.05 | 0.03 |
| 100° C.; 1 month | 0.05 | 0.03 |

What is claimed is:

1. A premix for the preparation of polyurethane or polyisocyanurate foams comprising at least one polyol, at least one hydrofluoroalkane blowing agent corresponding to the formula $CF_3-CR^1R^2-CF_2-R^3$, where $R^1$ and $R^2$ represent, independently of one another, a hydrogen atom or an optionally fluorinated $C_1-C_3$ alkyl group and where $R^3$ represents a hydrogen atom or a methyl group, and at least one stabilizer selected from brominated compounds.

2. The premix according to claim 1, in which the blowing agent is 1,1,1,3,3-pentafluoropropane.

3. The premix according to claim 1, in which the blowing agent is 1,1,1,3,3-pentafluorobutane.

4. The premix according to claim 1, in which the stabilizer comprises a brominated compound selected from the group consisting of bromoalkanes and bromoalcohols.

5. The premix according to claim 4, in which the brominated compound is a $C_1-C_{10}$ bromoalkane.

6. The premix according to claim 4, in which the brominated compound is tribromoneopentyl alcohol.

7. The premix according to claim 4, in which the brominated compound is 2,3-dibromobut-2-ene-1,4-diol.

8. The premix according to claim 4, in which the brominated compound comprises a brominated bisphenol A moiety.

9. The premix according to claim 4, in which the brominated compound is a brominated polyether polyol.

10. The premix according to claim 4, in which the brominated compound is a brominated aromatic polyester polyol.

11. In a rigid polyisocyanurate foam, the improvement comprising said rigid polyisocyanurate foam prepared by reacting an isocyanate with a premix according to claim 1.

12. In a process for preparing a polyurethane or polyisocyanurate foams, the improvement comprising reacting an isocyanate with a premix in accordance with claim 1.

13. A process for the manufacture of polyurethane or polyisocyanurate foams, in which at least one isocyanate is reacted with at least one polyol in the presence, firstly, of at least one hydrofluoroalkane corresponding to the formula $$CF_3-CR^1R^2-CF_2-R^3$$

where $R^1$ and $R^2$ represent, independently of one another, a hydrogen atom or an optionally fluorinated $C_1-C_3$ alkyl group and where $R^3$ represents a hydrogen atom or a methyl group, and, secondly, of at least one stabilizer selected from brominated compounds.

14. A polyurethane or polyisocyanurate foam prepared by a process in accordance with claim 13.

* * * * *